(12) United States Patent
Rensing

(10) Patent No.: US 10,696,912 B2
(45) Date of Patent: Jun. 30, 2020

(54) DEVICE FOR CONVEYING FUELS INTO A GASIFICATION REACTOR

(71) Applicant: CARE BETEILIGUNGSVERWAL TUNG GMBH, Vienna (AT)

(72) Inventor: Michael Rensing, Hamburg (DE)

(73) Assignee: CARE BETEILIGUNGSVERWALTUNG GMBH, Vienna (AT)

( * ) Notice: Subject to any disclaimer, the term of this patent is extended or adjusted under 35 U.S.C. 154(b) by 84 days.

(21) Appl. No.: 16/135,313

(22) Filed: Sep. 19, 2018

(65) Prior Publication Data

US 2019/0016979 A1 Jan. 17, 2019

Related U.S. Application Data

(62) Division of application No. 14/647,704, filed as application No. PCT/IB2013/002678 on Nov. 29, 2013, now abandoned.

(30) Foreign Application Priority Data

Nov. 29, 2012 (EP) .................................... 12450051

(51) Int. Cl.
*C10J 3/30* (2006.01)
*F23K 3/12* (2006.01)
(Continued)

(52) U.S. Cl.
CPC ................ *C10J 3/30* (2013.01); *B65G 25/08* (2013.01); *F23K 3/12* (2013.01); *B65G 53/08* (2013.01);
(Continued)

(58) Field of Classification Search
CPC ............................................... C10J 2300/1637
See application file for complete search history.

(56) References Cited

U.S. PATENT DOCUMENTS 4,256,035 A 3/1981 Neufeldt
4,650,546 A 3/1987 Le Jeune
(Continued)

FOREIGN PATENT DOCUMENTS

AT 384822 B 1/1988
AT 405 937 B 12/1999
(Continued)

OTHER PUBLICATIONS

International Search Report dated Apr. 1, 2014, issued in International Application PCT/I82013/002678.
(Continued)

*Primary Examiner* — Matthew J Merkling
(74) *Attorney, Agent, or Firm* — Fitch, Even, Tabin & Flannery, LLP

(57) ABSTRACT

A method of conveying fuel, such as bulk material, into a gasification reactor that has a lateral infeed opening can be practiced with device for conveying fuels into a gasification reactor comprising a bulk material container, a conveying pipe, into which a discharge of the bulk material container opens and which can be connected to a lateral infeed opening of the gasification reactor, and a mechanical conveying apparatus disposed in the conveying pipe, the conveying apparatus is formed by a hydraulically drivable plunger, which is movably guided in a first, cylindrical section of the conveying pipe, and in that the conveying pipe has an internal cross-section which decreases continuously in the conveying direction of the fuel in order to form a compacting cone in a second axial section that is downstream of the first section, wherein the second section is configured as an exchangeable pipe portion with another exchangeable pipe portion.

5 Claims, 3 Drawing Sheets

(51) Int. Cl.
*B65G 25/08* (2006.01)
*B65G 53/08* (2006.01)

(52) U.S. Cl.
CPC .... *C10J 2200/154* (2013.01); *C10J 2200/156* (2013.01); *F23G 2205/10* (2013.01)

(56) References Cited

U.S. PATENT DOCUMENTS

| | | | |
|---|---|---|---|
| 6,565,550 B1 | 1/2003 | Hamilton | |
| 7,993,131 B2 * | 8/2011 | Douglas | C10J 3/485 110/235 |
| 2005/0100496 A1 | 5/2005 | Blaschke et al. | |
| 2009/0178338 A1 | 7/2009 | Leininger | |
| 2009/0183430 A1 | 7/2009 | Schubert et al. | |
| 2011/0020145 A1 | 1/2011 | Katagiri et al. | |

FOREIGN PATENT DOCUMENTS

| | | |
|---|---|---|
| GB | 2317141 A | 3/1998 |
| WO | 93/00282 A1 | 1/1993 |
| WO | 99/34662 A1 | 7/1999 |

OTHER PUBLICATIONS

International Preliminary Examination Report issued in International Application PCT/I82013/002678.
Written Opinion of the International Searching Authority, English language translation dated May 29, 2015 in International Application PCT/I82013/002678.

* cited by examiner

DEVICE FOR CONVEYING FUELS INTO A GASIFICATION REACTOR

CROSS REFERENCE TO RELATED APPLICATIONS

This Application is a divisional application of U.S. application Ser. No. 14/647,704, filed May 27, 2015, which is U.S. National Stage Application filed under 35 U.S.C. § 371 of International Application PCT/IB2013/002678, filed Nov. 29, 2013, designating the United States, which claims priority from European Patent Application 12450051.3, filed Nov. 29, 2012, and the complete disclosures of which prior applications prior applications are hereby incorporated herein by reference in their entirety for all purposes.

FIELD OF THE INVENTIONS

The invention relates to a device for conveying fuels into a gasification reactor, comprising a bulk material container, a conveying pipe into which a discharge of the bulk material container opens and which can be connected to a lateral infeed opening of the gasification reactor, and a mechanical conveying apparatus disposed in the conveying pipe.

The invention also relates to a gasification device comprising a gasification zone to accommodate a stationary bed and a combustion zone to accommodate a fluidized bed, wherein the gasification zone and the combustion zone are interconnected to allow circulation of the bed material at two locations respectively by means of a sluice-like apparatus such as a constriction or a siphon, wherein the gasification zone comprises an infeed opening to feed in combustible material, a gas exhaust and a nozzle bottom for injecting in particular steam or $CO_2$, and the combustion zone comprises an air infeed for fluidizing the bed material entering the combustion zone from the gasification zone.

The invention also relates to a method of conveying fuel comprising bulk material into a gasification reactor that has a lateral infeed opening.

BACKGROUND

A gasification device of this type is known from patent document AT 405937 B. A gasification device of this type can be used to upgrade heterogeneous, biogenic fuels and synthetics and to obtain therefrom a fuel gas with a high calorific value or synthesis gas which is as free from nitrogen as possible, which is suitable for the production of electricity or for the synthesis of organic products. In that respect, the fuel is introduced into a gasification zone constituted as a stationary fluidized bed which is fluidized with steam and/or $CO_2$ and reacted with the fluidization gases or with the gasification agent (steam and/or $CO_2$) and degassed with the aid of heat from the bed material and partially gasified with the exclusion of air. The product gas which rises is then drawn off and the cooled bed material with the non-gasified remaining fuel is fed to the combustion zone via sluice-like devices, such as a constriction. In the combustion zone, the bed material is fluidized with the remaining fuel using air, to form a rapidly moving fluidized bed and the remaining fuel is burned. After extracting the combustion exhaust gas in a cyclone via sluice-like devices, for example a siphon, the bed material is fed to the stationary fluidized bed of the gasification zone.

By using a catalytically active bed material, in particular based on nickel and/or niobium, the gas formed upon degassing and gasification is purified, insofar as practically only CO, $CO_2$ and $H_2$ as the combustible components along with steam are present, or a methane-rich gas with a high calorific value is produced. Furthermore, the gasification temperature can be reduced from approximately 800° C. to 650° C.

The gasification device described in AT 405937 B is suitable for the gasification of carbonaceous material, in particular heterogeneous or biogenic fuels such as biomass, coal, synthetics or pre-sorted rubbish, for example, wherein a mixed gas which contains CO, $CO_2$, $H_2$ and possibly $CH_4$ and higher hydrocarbons is produced. If the gasification takes place entirely in the presence of a nickel or niobium catalyst, then the hydrocarbons such as $CH_4$, for example, are also converted into CO and $H_2$. Avoiding the ingress of air means that a practically nitrogen-free production gas is obtained, which has a high heat value.

Supplying fuel which is usually in the form of bulk material to a gasification reactor is usually carried out with the aid of a mechanical conveying apparatus. In this regard, then, the conveying apparatus must comply with a series of specific demands which are dictated by the gasification reactor. As an example, the conveying apparatus is subjected to a high thermal load because of the temperatures of up to 800° C. prevailing in the gasification reactor, and so care has to be taken to ensure the provision of sufficient cooling for the conveying apparatus. Furthermore, the conveying apparatus has to exclude air so as not to impair the gasification process. In addition, the air must be securely excluded from the conveying apparatus so as not to have a deleterious effect on the gasification process. Furthermore, the construction should be such as to ensure a low level of wear and thus low maintenance costs. Finally, the conveying apparatus should be such as to allow good dosing of the fuel.

In the subject matter of AT 405937 B, conveying into or onto the stationary bed of the gasification zone is carried out with the aid of a screw conveyor. However, this suffers from a series of disadvantages, namely that the screw conveyor is difficult to cool and that, because of the fluctuating degree of filling of the screw, it is difficult to exclude air properly. Furthermore, the screw conveyor is susceptible to breakdowns, which is disadvantageous since the gasification reactor has to be shut down for repair every time it breaks down.

SUMMARY AND OBJECTS OF THE INVENTIONS

The aim is therefore to provide a conveying apparatus for gasification reactors with which all types of biogenic fuels can be continuously transported and introduced into the gasification chamber. In particular, the apparatus should be suitable for conveying fuels with various densities and different compositions in the same manner. Furthermore, the disadvantages associated with the screw conveyor described above should be avoided.

The invention achieves this aim by proposing a conveying apparatus for gasification reactors of the type described above in which essentially, the conveying apparatus is formed by a hydraulically drivable plunger which is movably guided in a first, cylindrical section of the conveying pipe, and in that the conveying pipe has an internal cross-section which reduces continuously in the direction of conveying the fuel in order to form a compacting cone in a second axial section. Preferably, the compacting cone is located in the last third of the second conveying pipe section in the direction of conveying. The invention therefore proposes hydraulic conveying, which has the advantage of low maintenance costs with a high availability and in addition, with uniform dosing. The hydraulic drive allows greater forces to be applied in the conveying direction so that, for example in the case of a gasification reactor of the type described in AT 405937 B, the fuel can be forced into the upper surface of the bed of fuel, whereupon good mixing is ensured in the fluidized bed and pulsing in the gasification chamber is avoided. In this manner, the fuel is thus conveyed continuously at a uniform rate during the forward stroke. The rearward stroke of the plunger is then carried out at a higher speed in order to get to the next conveying cycle without too great an interruption.

By means of the hydraulic conveying apparatus of the invention, it is possible to convey fuel of widely differing natures, in particular wood chips, various rubbish fractions, coal, other biogenic agriculturally-derived materials or paste-like flammable waste from the papermaking industry.

Further, the hydraulic conveying apparatus of the invention can be used to exclude air from the gasification chamber in a simple manner, which in particular is reinforced by the compaction of the fuel in the compacting cone. The exclusion of air is an essential factor to the quality of the gasification process. The compacting cone is an important component of the gasification device since, by making the opening cross section smaller, it adjusts the compaction pressure or it enables a diminution of the air gaps of the various types of fuel. In this manner, the compaction pressure is also vital as regards the purity and quality of the gas produced in the gasification reactor. Because of the high compaction of the fuel, a plug of fuel is produced inside the conveying pipe which constitutes an excellent and reliable means of excluding air.

Advantageously in this regard, the plug of fuel is disposed as close as possible to the gasification reactor, i.e. the air exclusion occurs as far as possible in the immediate vicinity of the infeed opening of the gasification reactor. In this manner, the radiant heat in the gasification reactor does not gain access to the fuel conveying region which would then lead to an excessive thermal load on the conveying apparatus, and thus would increase the cooling expenditure. Thus, in a preferred further embodiment of the conveying device of the invention, the second conveying pipe section comprising the compacting cone is connected to the infeed opening of the gasification reactor. Preferably in this regard, the compacting cone merges directly into the infeed opening.

Different fuels may require different degrees of compaction. Thus, particularly advantageously, the degree of compaction set by the compacting cone can be adapted to the respective fuel. In this regard, in a preferred embodiment, the second conveying pipe section comprising the compacting cone is configured as a separate exchangeable pipe portion. In order to operate the conveying apparatus a plurality of exchangeable pipe portions can therefore be held in stock which each comprise a compacting cone with a different degree of compaction and, depending on the fuel employed, the pipe portion with the appropriate degree of compaction can be installed.

When the exchangeable pipe portion or the compacting cone opens directly into the gasification reactor the second conveying pipe section comprising the compacting cone can be advantageously connected to the infeed opening of the gasification reactor by interposing a fitting. A fitting of this type is intended to protect the front of the compacting cone against excessive a heat load. This is of particular advantage when the cone is at the height of a fluidized bed of the gasification reactor where a radiative temperature of 850-950° C. can be expected. The fitting also serves to provide a transition between the compacting cone, the opening diameter of which is a function of its cone angle, and the infeed opening of the gasification reactor. Thus, each different cone has a respective fitting. The combustible material is conveyed out of the compacting cone via the fitting into the gasification reactor, wherein the fitting may have an internal diameter which increases in the direction of conveying in order to provide a continuous transition to the internal diameter of the infeed opening of the gasification reactor.

In order to facilitate installation and dismantling of the exchangeable pipe portion, in a preferred embodiment, a pipe portion forming the first conveying pipe section and the second exchangeable pipe portion are interconnected via an adapter forming an intermediate section of the conveying pipe. The adapter is removed when the compacting cone is changed in order to be able to pull the compacting cone out of its end position. In a particularly advantageously manner, the adapter can be removed from the conveying pipe in the radial direction.

Since the conveying device opens directly into the gasification reactor in which temperatures of up to 850-950° C. prevail, the conveying device is advantageously cooled at least in the region adjacent to the gasification reactor, so that the fuel does not commence gasification in the conveying pipe. In accordance with a preferred embodiment of the invention, an end section of the conveying pipe adjacent to the infeed opening of the gasification reactor is surrounded by a cooling jacket of a cooling device. The cooling jacket comprises at least one cooling fluid inlet and a cooling fluid outlet and cooling fluid, for example water, can flow through it. Preferably, the cooling water outlet temperature does not exceed 60° C., since otherwise, any plastic possibly contained in the fuel would start to melt.

Thus, preferably in this regard, the cooling jacket surrounds at least the conveying pipe section provided with the compacting cone. Preferably, the cooling jacket forms a unit with the conveying pipe section.

The cooling fluid temperature is an indicator of the thermal load acting on the conveying pipe and the fuel disposed therein, and thus can readily be used for control purposes. In this regard, in a further embodiment of the invention, a cooling fluid inlet and a cooling fluid outlet are connected to the cooling jacket, wherein a temperature sensor is provided to measure the outlet temperature of the cooling fluid withdrawn from the cooling jacket via the cooling fluid outlet, its measured values are fed to a control device which cooperates with the drive of a cooling fluid circulating pump in order to control the throughput as a function of the cooling fluid temperature measured during continuous operation. Control can, for example, be such that during start-up and at maximum circulating pump power, the forward stroke of the plunger is advanced faster or slower as a function of the measured temperature values.

During start-up and shut-down of the gasification reactor, it is possible that there is no fuel or no more fuel in the compacting cone, so that hot gas can gain ingress to the conveying system from the reactor and cause a burn-back in the conveying pipe or in the bulk material container. To avoid this, in a preferred embodiment, the first conveying pipe section is provided with a shut-off valve which can be displaced perpendicularly to the conveying direction.

A further safety measure is the provision of an inert gas connection to the conveying pipe. In order to inertise the gasification device, an inert gas, for example nitrogen, is deliberately fed into the unit so that during start-up or shut-down, or a breakdown, an explosive mixture of gas cannot be built up. For serious breakdowns, it is basically necessary to additionally separate the fuel supply to the gasification device by closing the shut-off valve.

In order to reduce the overall length of the plunger or the hydraulic cylinder forming the drive for the piston, the front face of the plunger is preferably formed as a part of the plunger which can be extended in the conveying direction. In this manner, the plunger can be extended if necessary. Extending is, for example, carried out with the aid of a hydraulic cylinder housed in the plunger. In normal operation, i.e. for continuous conveying of the fuel, the plunger is operated in the non-extended state. Only for the emptying stroke, during which the fuel in the conveying system has to be discharged to beyond the adapter as far as possible, will the length of the plunger be extended by extending the extendable front portion, for example by 500-1000 mm. Thus, during the emptying stroke, the guiding stability of the plunger is improved. To commence the emptying stroke, the plunger initially runs through its maximum working stroke in the conveying direction until the plunger arrives under the bulk material container, in order to completely block off the ingress of fuel into the conveying pipe. Thereafter, the extendable front portion of the plunger is automatically extended in order to remove fuel, which is still in the conveying pipe until a short plug is left. After the plunger has moved back, the shut-off valve can be closed in order to start inerting or shutting the unit down.

For continuous conveying of the fuel, it is vital that the fuel does not agglomerate in the bulk material container and does not tend to bridging, thereby preventing the fuel from falling out of the bulk material container under gravity and thus preventing discharge into the conveying pipe. The discharge is basically promoted, if, as in accordance with a preferred embodiment, the bulk material container comprises a discharge hopper. In this regard, the fuel should be comminuted into particles of approximately 4 to 5 cm in diameter in order to prevent bridging in the bulk material container and also to prevent blockages when conveying with the plunger. In higher power units, the comminuted fuel can be correspondingly larger, in proportion to the larger conveying components, but only up to a maximum of an 8 cm particle diameter.

A blockage in the bulk material container is preferably further prevented by providing the discharge hopper with a wall, which is at the front in the direction of conveying, and encloses an angle of 0-20°, preferably 5-15° with a normal to the conveying pipe axis. Said wall is thus inclined relatively steeply downwards so that the fuel does not have the opportunity to pile up due to the pressure exerted on the wall by the plunger in the conveying direction. Said steeply inclined configuration of the wall of the bulk material container closer to the gasification reactor further contributes to disposing the bulk material container closer to the gasification reactor, so that the conveying path can be reduced.

In addition, the rear wall of the discharge hopper as seen in the conveying direction preferably encloses an angle of 10-40°, preferably 20-35° with a normal to the conveying pipe axis, whereby also this wall is relatively steeply inclined.

However, if blockages should still occur in the outlet region of the bulk material container, these can preferably be removed by providing a disaggregation device for the fuel in the region of the discharge opening of the discharge hopper which preferably comprises a plurality of air injection openings distributed over the circumference.

When, in accordance with a further preferred embodiment, the axis of the conveying pipe is downwardly inclined, wherein the angle of inclination measured with respect to the horizontal is preferably in the range of 5° to 30°, the bed material is largely prevented from penetrating from the gasification chamber directly into the outlet area of the cone or further into the conveying pipe. Furthermore, the fuel is always intentionally forced into the fluidized bed of the gasification reactor.

The invention will now be described in more detail with the aid of the exemplary embodiments diagrammatically illustrated in the accompanying drawings, in which FIG. 1 shows a sectional view of a gasification reactor with the conveying device according to the invention, FIG. 2 shows a sectional view of the device of according to the invention, which comprises a conveying pipe inclined at 15° and FIG. 3 shows a detailed view of the embodiment of FIG. 2 in the region of the transition between the second exchangeable conveying pipe section and the gasification reactor.

DETAILED DESCRIPTION

Figure 1:
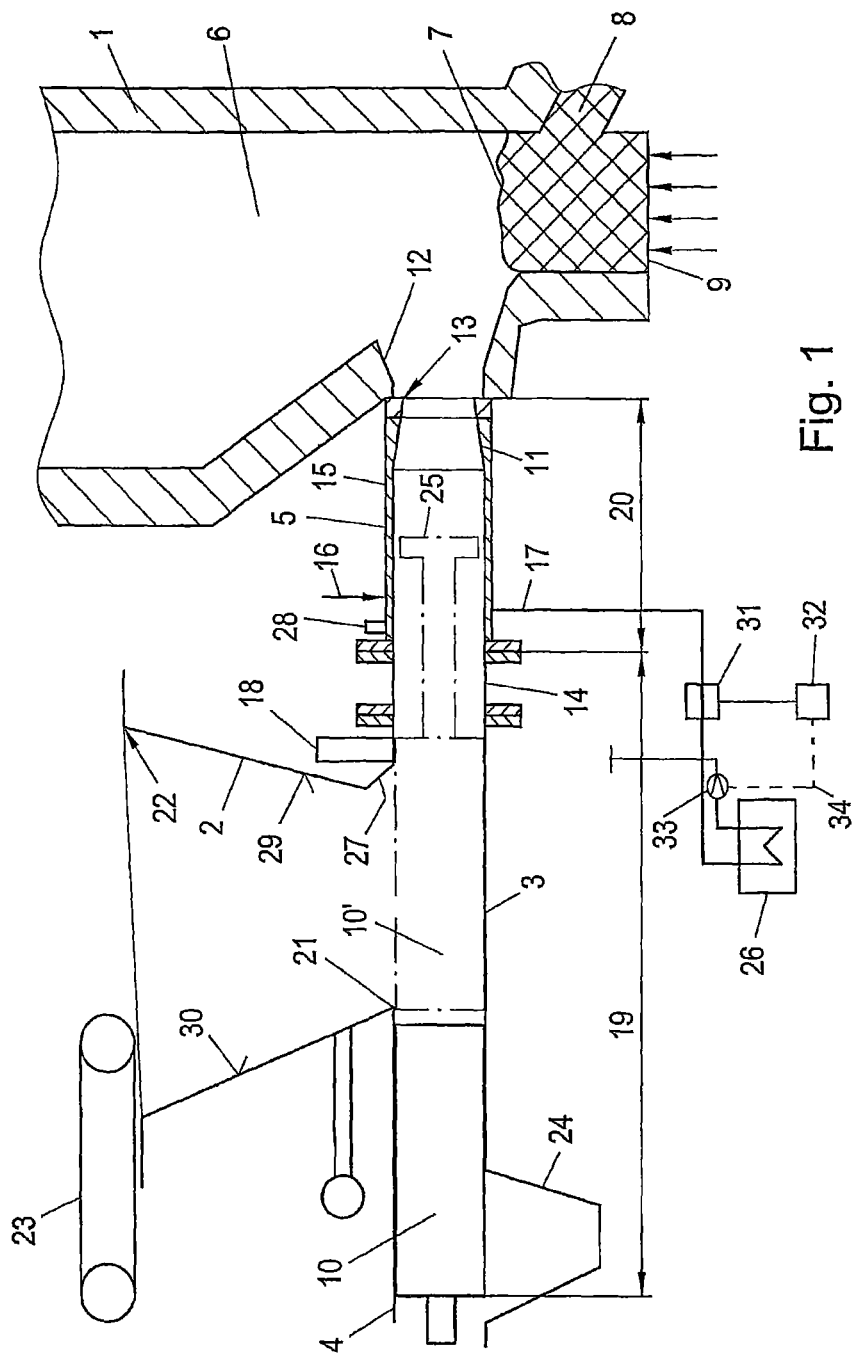
FIG. 1 shows a gasification reactor 1, which is connected to a device for conveying fuels, which comprises a bulk material container 2, a conveying pipe 3 into which the discharge from the bulk material container 2 opens, and a mechanical conveying apparatus 4 disposed in the conveying pipe 3.

In FIG. 1, the gasification reactor 1 is in particular a reactor such as that described in AT 405937 B.

The gasification reactor 1 comprises a gasification zone 6 for accommodating a stationary bed 7 and a combustion zone (not shown in the drawing) to accommodate a fluidized bed. The gasification reactor 1 and the combustion zone (not shown in the drawing) are interconnected in the lower region via a sluice-like apparatus 8, wherein the gasification zone comprises a gas exhaust (not shown in the drawing) and a nozzle bottom 9, in particular for the injection of steam or $CO_2$.

The mechanical conveying device 4 comprises a hydraulically drivable plunger 10 displaceably guided in a first cylindrical section 19 of the conveying pipe 3. The plunger 10 can be moved to and fro between the withdrawn position shown in the drawing with numeral 10 and the forward position shown with numeral 10'. Furthermore, the second axial section 20 of the conveying pipe 3 comprises an internal cross section, which decreases continuously in the conveying direction of the fuel in order to form a compacting cone 11. The conveying pipe section 5 comprising the compacting cone 11 is exchangeable and is connected via a fitting 13 to the infeed opening 12 of the gasification reactor 1.

The exchangeable conveying pipe section 5, which is surrounded by a cooling jacket 15 of a cooling device, is connected to the adapter 14 with the aid of a flange connection. The cooling jacket 15 comprises a cooling fluid inlet 16 and a cooling fluid outlet 17. The cooling fluid outlet 17 is connected with a heat exchanger 26, in which the cooling fluid, which has been heated by passage through the cooling jacket, is cooled down, whereupon it is once more supplied to the cooling device via the cooling fluid inlet 16.

In order to allow the conveying pipe section 5 to be changed, firstly, the adapter 14 has to be removed, whereby the flange connections of the adapter 14 are released from the two bordering conveying pipe sections and the adapter 14 is removed from the pipe run perpendicularly to the conveying pipe axis. The gap thus formed then allows the conveying pipe section 5 with the compacting cone 11 to be pulled out horizontally from its location in the direction opposite to the conveying direction and exchanged for a new conveying pipe section 5. Exchange results in that pipes with different degrees of compaction of the compacting cone 11 can be used.

The first conveying pipe section 19 is provided with a shut-off valve 18, which can be displaced perpendicularly to the conveying apparatus. If, at the time of start-up or shut-down of the gasification reactor 1, no fuel is present in the compacting cone 11 yet or no fuel is present any more by actuating the displaceable shut-off valve 18, a burn-back in the conveying pipe 3 or the bulk material container 2 can be prevented. The conveying pipe also comprises an inert gas connection 28 in order to feed inert gas into the interior of the conveying pipe, if necessary.

The bulk material container 2 is in the shape of a hopper, i.e. a shape which tapers conically to the discharge opening 21 of the bulk material container 2. In this regard, the front wall 29 as seen in the conveying direction of the bulk material container 2 has a larger angle of inclination than the rear wall 30 as seen in the conveying direction, in order to prevent blockages of the fuel at the front wall 29 of the bulk material container 2. In the region of the discharge opening 21 of the discharge hopper a disaggregation device 27 is arranged, which is not shown in great detail and which, for example, comprises a plurality of air nozzles, which are supplied with air and which are distributed over the circumference. In order to supply fuel to the unit, the conveyor belt 23 is connected to the infeed region 22 of the bulk material container 2. In addition, the device according to the invention is provided with the cleaning chute 24 which, if necessary, allows access to the first section 19 of the conveying pipe 3.

The plunger 10 houses a telescopic part 25 which, if the unit is shut down, acts to convey fuel out of the conveying pipe 3. To this end, the plunger is initially driven into the position 10' and then the extendable part 25 of the plunger 10 is extended.

When starting up the unit, the forward movement of the plunger 10 can be controlled as a function of the temperature increase in the gasification reactor. During the heating phase of the gasification reactor, the fuel is supplied in accordance with the temperature increase of the cooling fluid temperature measured with the aid of the temperature sensor 31 in order to keep it constant. To this end, the cooling fluid outlet temperature of the cooling jacket is continuously monitored. If the cooling fluid outlet temperature in the start-up phase is unacceptably high, the plunger 10 can slowly push more material in order to protect the interior of the compacting cone from too much radiant heat from the gasification zone, which is caused by downstream gasification of the fuel at the infeed opening 12. Furthermore, the circulation of the cooling fluid pump 33 is increased with increasing temperature. The speed of the plunger 10 can also be increased, corresponding to the temperature increase in the gasification reactor, so that when the final temperature of approximately 850° C. is reached in the gasification zone, the required quantity of fuel corresponding to the configuration of the unit is available in the reactor for gasification. For temperature-dependent control, the temperature sensor 31 is connected to a control device 32, in which the control signals for the cooling fluid pump 33 are generated. A control line 34 is provided to transmit the control signals to the pump unit.

Figure 2:
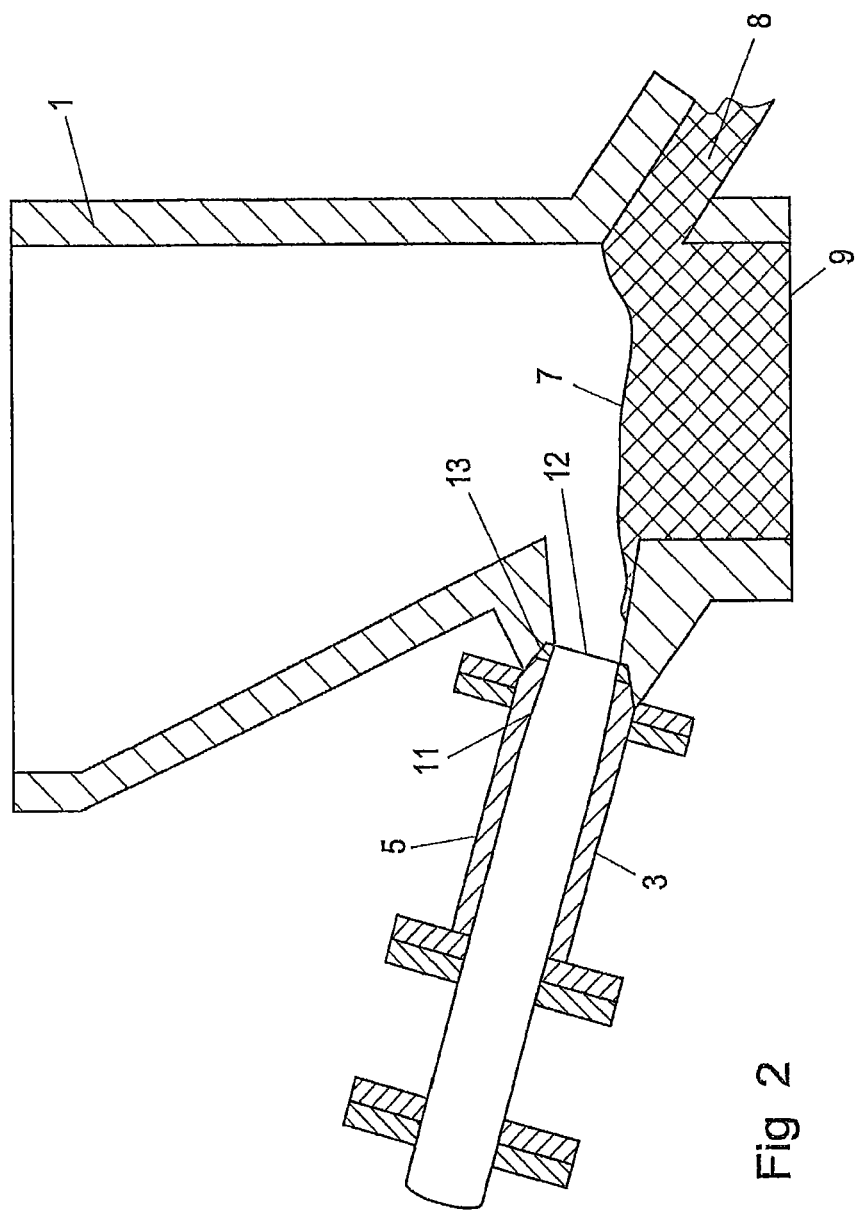
FIG. 2 shows a section through a modified configuration of the device of FIG. 1, which comprises a downwardly inclined axis of the conveying pipe 3.

FIG. 2 shows a section through a modified configuration of the device of FIG. 1, which comprises a downwardly inclined axis of the conveying pipe 3. The inclined conveying pipe axis is at an angle of 15° to the horizontal.

Figure 3:
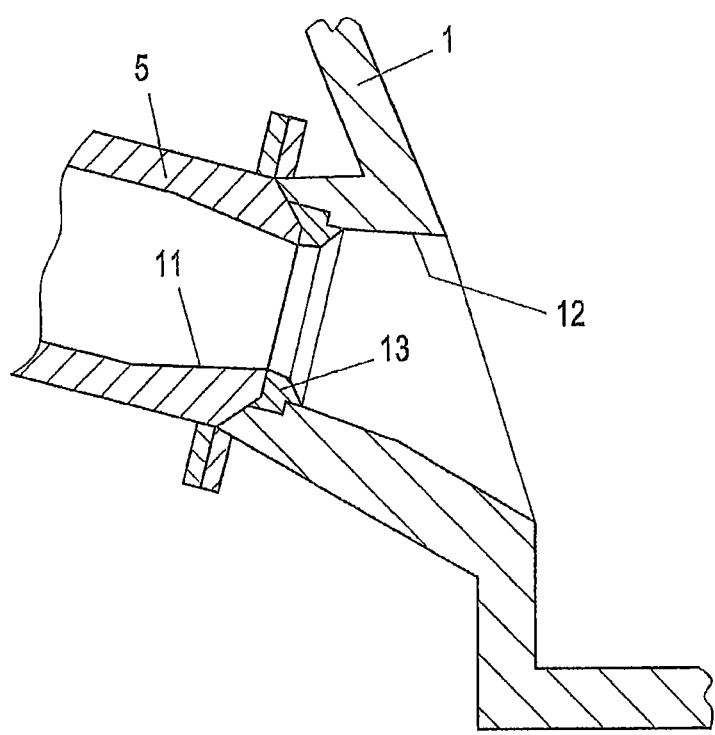
FIG. 3 shows an embodiment in which the exchangeable pipe portion 5 comprising the compacting cone of the conveying pipe is connected to the infeed opening 12 of a gasification reactor 1 via a fitting 13.

As can be seen from the detailed illustration of FIG. 3, the exchangeable pipe portion 5 comprising the compacting cone 11 of the conveying pipe is connected to the infeed opening 12 of the gasification reactor 1 via a fitting 13.

The invention claimed is:

1. A method of conveying fuel comprising bulk material into a gasification reactor that has a lateral infeed opening, wherein the fuel is conveyed to the lateral infeed opening through a conveying pipe, said conveying pipe comprising a first cylindrical section and a second section being arranged downstream of the first cylindrical section and having an internal cross-section, which decreases continuously in the conveying direction of the fuel in order to form a compacting cone, wherein the second section is configured as an exchangeable pipe portion, the method comprising providing at least two exchangeable pipe portions, each configured to comprise a second section of the conveying pipe, said at least two exchangeable pipe portions having compacting cones that differ from each other in their degree of compaction, selecting one of said at least two exchangeable pipe portions based on a desired degree of compaction, the desired degree of compaction depending on the type of fuel to be conveyed, interposing a fitting between the exchangeable pipe portion and the lateral infeed opening, said fitting being configured to accept an exchangeable pipe portion selected from among the at least two exchangeable pipe portions, installing the selected exchangeable pipe portion, providing an adapter between the first cylindrical section of the conveying pipe and the exchangeable pipe portion, the adapter comprising an intermediate section for interconnecting the first cylindrical section of the conveying pipe and the exchangeable pipe portion, the adapter configured to allow for removal from the conveying pipe in the radial direction, discharging the fuel into the conveying pipe from a bulk material container, the bulk material container having a discharge hopper with a discharge opening to the first cylindrical section of the conveying pipe, and having a plurality of air injection openings distributed over the circumference of the discharge hopper in the region of the discharge opening, disintegrating the fuel, while being discharged, by means of air jets that are directed onto the fuel from the plurality of air injection openings, firstly conveying the fuel through said first cylindrical section of the conveying pipe by means of a hydraulically drivable plunger, which is movably guided in the conveying pipe towards the infeed opening, secondly conveying the fuel through said second section of the conveying pipe by means of the hydraulically drivable plunger, said second section being arranged downstream of the first cylindrical section, and compacting the fuel that is conveyed through the second section by means of said compacting cone, thirdly conveying the compacted fuel via the lateral infeed opening into the gasification reactor, cooling the second section of the conveying pipe including the compacting cone with a cooling jacket surrounding the second section, wherein a cooling fluid inlet and a cooling fluid outlet are connected to the cooling jacket, wherein the temperature of the cooling fluid withdrawn from the cooling jacket via the cooling fluid outlet is measured by means of a temperature sensor and the measured values are fed to a control device, which cooperates with a drive of a cooling fluid circulating pump, wherein the rate per time unit, at which the cooling fluid is conveyed, is controlled as a function of the measured cooling fluid temperature, wherein in the conveying the hydraulically drivable plunger is moved towards the infeed opening to reach its maximum working stroke in the conveying direction, wherein the hydraulically drivable plunger, at its maximum working stroke, blocks off the ingress of fuel from a bulk material container into the conveying pipe.

2. A method for introducing fuel to a gasification reactor having a lateral infeed opening for the introduction of a fuel comprising bulk material, said method comprising providing a device for conveying fuel into a gasification reactor, the device having a bulk material container for receiving fuel, the bulk material container having a discharge opening through which fuel is discharged, a conveying pipe for receiving fuel discharged from the discharge opening of the bulk material container, and an opposing end connected through a fitting to the lateral infeed opening of the gasification reactor, the conveying pipe having a first cylindrical section and a second section, a mechanical conveying apparatus disposed in the conveying pipe to convey fuel received through the discharge opening towards the lateral infeed opening, the conveying apparatus comprising a hydraulically drivable plunger, which is movably guided in the first cylindrical section of the conveying pipe, the conveying pipe having an internal cross-section decreasing in the conveying direction of the fuel, and a compacting cone in the second section of the conveying pipe, the compacting cone having a smaller internal cross-section than the internal cross-section in the first section of the conveying pipe, the second section having the compacting cone is configured as a separate exchangeable pipe portion, wherein the separate exchangeable pipe portion is exchangeable with another exchangeable pipe portion to provide a compacting cone for imparting a selected degree of compaction to the fuel to be compacted by the compacting cone, the conveying pipe having the opposing end external to, and fitted to a fitting interposed between the opposing end and the lateral infeed opening so the opposing end is fitted to the lateral infeed opening, whereby the separate exchangeable pipe section comprising the compacting cone is connected to the lateral infeed opening of the gasification reactor via the fitting, wherein the fitting is configured to accept an exchangeable pipe section selected from among a plurality of exchangeable pipe sections having a compaction cone configured to provide a degree of compaction, and the fitting is configured so the second section of the conveying pipe can be connected or disconnected from the infeed opening so that an exchangeable pipe section is replaceable with another exchangeable pipe section, an adapter forming an intermediate section of the conveying pipe, the adapter configured so the first section and the second section of the conveying pipe can be connected together and can be disconnected when replacing the exchangeable pipe section, the adapter configured to accept an exchangeable pipe section selected from among a plurality of exchangeable pipe portions each having a compaction cone configured to provide a degree of compaction, the adapter forming an intermediate section of the conveying pipe, and a cooling device including a cooling jacket that surrounds at least the conveying pipe section having the compacting cone;

feeding fuel into the bulk material container and discharging fuel through the discharge opening into the conveying pipe, and conveying the fuel through the conveying pipe, through the compaction cone and through the lateral infeed opening into the gasification reactor.

3. A method claim according to claim 2, wherein said method further comprises changing the degree of compaction of the fuel in the compaction cone in the conveying pipe by exchanging the exchangeable pipe section with another exchangeable pipe section that has compaction cone with a different degree of compaction.

4. A method according to claim 1, wherein the method further comprises changing the degree of compaction of the fuel in the compaction cone in the conveying pipe by exchanging the exchangeable pipe section with another exchangeable pipe section having a degree of compaction appropriate for a different fuel comprised of bulk material; and changing the fuel to the different fuel.

5. A method according to claim 3, wherein the adapter is removable in the radial direction, and wherein changing the degree of compaction further comprises removing the adapter in the radial direction.

* * * * *